United States Patent
Spjut

(10) Patent No.: US 12,364,928 B2
(45) Date of Patent: Jul. 22, 2025

(54) GAME CHEAT DETECTION FROM MOUSE LIFTING

(71) Applicant: NVIDIA Corporation, Santa Clara, CA (US)

(72) Inventor: Josef Spjut, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 354 days.

(21) Appl. No.: 17/973,163

(22) Filed: Oct. 25, 2022

(65) Prior Publication Data
US 2023/0241513 A1 Aug. 3, 2023

Related U.S. Application Data

(60) Provisional application No. 63/305,982, filed on Feb. 2, 2022.

(51) Int. Cl.
*A63F 13/75* (2014.01)
*G06F 3/0354* (2013.01)

(52) U.S. Cl.
CPC .......... *A63F 13/75* (2014.09); *G06F 3/03543* (2013.01)

(58) Field of Classification Search
CPC .... A63F 13/98; A63F 13/24; A45F 2005/006; A45F 2005/008; A45F 5/00; A45B 2009/002; A45B 2009/025
See application file for complete search history.

(56) References Cited

U.S. PATENT DOCUMENTS

2021/0041966 A1* 2/2021 Heer .................... G06F 3/04847
2022/0203242 A1* 6/2022 Chi .......................... G06N 5/04

OTHER PUBLICATIONS

"Bot Detection in Online Games through Applied Machine Learning and Statistical Analysis of Mouse Movements" by Gavin McCracken (Year: 2018).*

* cited by examiner

*Primary Examiner* — Peter J Iannuzzi

(57) ABSTRACT

A method, system, and computer program product for mouse lift cheat detection are provided. In one embodiment, the method includes receiving mouse movement data from a mouse device and determining if a distance represented by the mouse movement data can be performed by a human. When the distance cannot be performed by a human, the method further includes determining if a mouse lift pattern exists. When the mouse lift pattern exists, the method further includes determining if the distance can be performed by a human considering the mouse lift pattern. An alert is generated when the distance represented by the mouse movement cannot be performed by a human whether the mouse lift pattern exists or not. The alert is not generated when the distance represented by the mouse movement data can be performed by a human whether the mouse lift pattern exists or not.

29 Claims, 4 Drawing Sheets

GAME CHEAT DETECTION FROM MOUSE LIFTING

CROSS-REFERENCE TO RELATED APPLICATION

This application claims the benefit of U.S. Provisional Application Ser. No. 63/305,982, filed by Josef Spjut, on Feb. 2, 2022, entitled "GAME CHEAT DETECTION FROM MOUSE LIFTING," commonly assigned with this application and incorporated herein by reference in its entirety.

TECHNICAL FIELD

This application is directed, in general, to cheat detection systems and methods. More specifically, this application is directed to systems and methods to detect possible cheating during game play based on mouse movement.

BACKGROUND

Improved game play capabilities provided by game developers and game hardware manufacturers have become increasingly popular amongst users. With the advent of esports, competitive game play has enabled users with significant financial opportunities. With improved game play capabilities, a small percentage of users will try to take advantage of existing game play systems and methods in order to gain an advantage over other users by using, e.g., cheating software and/or hardware, collectively referred to as a cheating tool. Thus, game developers and game hardware manufacturers, at a minimum, have an interest in keeping their products immune from these cheating tools as the cheating tools can ruin the competitive integrity of otherwise fair matches. Users who are playing a game where they believe game cheating is occurring will likely just stop playing the game and are not likely to play the game in the future or even purchase games from the same game developer in the future.

BRIEF DESCRIPTION OF THE DRAWINGS

Reference is now made to the following descriptions taken in conjunction with the accompanying drawings, in which.

SUMMARY OF THE DISCLOSURE

Figure 1:
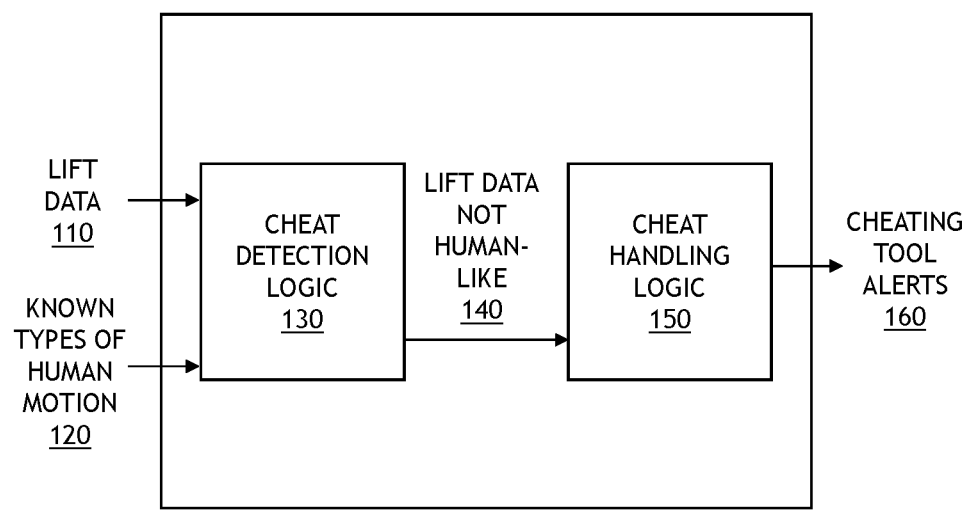
FIG. 1 illustrates a block diagram of an example of a cheat detection system in which at least a portion of the systems, methods, or computer program products disclosed herein can be implemented.

In one aspect, a mouse lift cheat detection method is disclosed. In one embodiment, the method includes receiving mouse movement data from a mouse device and determining if a distance represented by the mouse movement data can be performed by a human. When the distance represented by the mouse movement data cannot be performed by a human, the method further includes determining if a mouse lift pattern exists. When the mouse lift pattern exists, the method further includes determining if the distance represented by the mouse movement data can be performed by a human considering the mouse lift pattern. The method further includes generating an alert when the distance represented by the mouse movement cannot be performed by a human when a mouse lift pattern does not exist or considering the mouse lift pattern when the mouse lift pattern exists. The method further includes refraining from generating the alert when the distance represented by the mouse movement data can be performed by a human whether the mouse lift pattern exists or not.

In another aspect, a gaming system is disclosed. In one embodiment, the gaming system comprises a memory including operating instructions and one or more processors that perform operations according to the operating instructions. The operations at least include receiving mouse movement data corresponding to motion of a mouse connected to the gaming system, determining where the mouse movement is human-like or not human-like using mouse lift data, and generating an alert signal when determining the mouse movement data is not human-like.

In another aspect, a computer program product embodied on a non-transitory computer-readable medium which includes instructions that cause at least one processor to perform a method is disclosed. In one embodiment, the method includes receiving mouse movement data from a mouse device and determining if a distance represented by the mouse movement data can be performed by a human. When the distance represented by the mouse movement data cannot be performed by a human, the method further includes determining if a mouse lift pattern exists. When the mouse lift pattern exists, the method further includes determining if the distance represented by the mouse movement data can be performed by a human considering the mouse lift pattern. The method further includes generating an alert when the distance represented by the mouse movement cannot be performed by a human when a mouse lift pattern does not exist or considering the mouse lift pattern when the mouse lift pattern exists. The method further includes refraining from generating the alert when the distance represented by the mouse movement data can be performed by a human whether the mouse lift pattern exists or not.

DETAILED DESCRIPTION OF THE DISCLOSURE

As noted above, some competitive users of gaming software and gaming will use specific cheating tools such as, e.g., specific cheating software, specific cheating hardware, or a combination thereof, to gain a competitive advantage in their game play. As used herein, a user includes, e.g., a human game player, or gamer. One class of cheating tools controls a mouse input to gaming hardware for a given game, either through cheating software or cheating hardware, allowing the mouse input to represent movement that humans could not perform on their own. One cheating technique used is to write cheating software that can interrogate memory on gaming hardware that identifies locations of opponents during game play of a specific game utilizing gaming software run on the gaming hardware. If a user were to use their mouse to move their location during game play to locations identified by the cheating software, this could require the user to lift their mouse at least once, but probably many more times, wherein each lift of the mouse is defined as a mouse lift. However, once the cheating software identifies locations of opponents, the software can then inject synthetic mouse motion into the gaming software to move the user's location to that identified for the user's opponents without any mouse lifts.

This disclosure provides a method, system, and computer program product to monitor, identify, alert, and possibly correct, when a cheating tool violates that which is otherwise natural human control of movement of the mouse. A disclosed cheating detection strategy uses mouse lift (often called clutching) patterns to identify when a cheating tool has been employed in game play. For example, in the extreme, a user cannot move a mouse more than a certain distance, such as six feet, without lifting the mouse off of a surface on a vast majority of desks that the mouse rests on (or off of a surface of a mouse pad that rests on the surface of the desk). So, if during game play, game play movement is detected representing mouse movement greater than this distance without detecting any mouse lifts, it can be reasonably assumed that a cheating tool has been employed.

Many mouse devices include sensors that can detect when the mouse is lifted off a surface. These mouse devices include optical sensors which detect reflections of light generated by the mouse device off of the surface, typically in the infrared light spectrum. When the light reflected from the surface sensed by the optical sensor of the mouse is determined by the mouse to be in focus, the mouse concludes there is no lift of the mouse itself. However, if the light reflected from the surface sensed by the optical sensor of the mouse is determined by the mouse to be out of focus, the mouse concludes the mouse has been lifted off of the surface. From these determinations, the mouse generates lift data indicating the mouse has been lifted off of the surface.

Other mouse devices can include a proximity/height sensor. These proximity/height sensors can utilize a time-of-flight technique, e.g., determining an amount of time a signal generated by the proximity/height sensor takes to travel from the proximity/height sensor to the surface and return from the surface to the proximity/height sensor, to indicate a proximity/height of the mouse to the surface, e.g., the surface of the mouse pad. Alternatively, the proximity/height sensor of the mouse can determine a proximity/height of the mouse by use of a mechanical device, e.g., a contact switch. The proximity/height sensor also could be an accelerometer which could detect lift by measuring acceleration away from the surface. From these determinations, the mouse generates lift data indicating the mouse has been lifted off of the surface Some mouse devices can determine an actual height the mouse is above a surface. These mouse devices can be configured to stop reporting motion of the mouse when the height of the mouse above the surface is determined to be greater than a threshold. Much like allowing a user to customize a sensitivity of x-y movement of their mouse, this capability would allow for users to customize when to stop reporting motion of the mouse based on a height of the mouse over the surface. This height, in a, e.g., z-direction, could also be used to communicate a mouse height to the gaming software and could be used to detect mouse lift.

As an alternative option to obtaining lift data or mouse height data directly from the mouse to detect mouse lift, other techniques can be employed to approximate lift data. In one technique, periods of no motion of the mouse either before or after periods of fast motion of the mouse may be statistically modeled to identify likely mouse lifts in software. For example, if a normal lift takes 300-400 mS, detecting no motion from a mouse for this duration either before or after periods of fast motion could be interpreted as a mouse lift. In another technique, detections of no motion duration that fall within a range expected for a normal lift could be interpreted as a mouse lift as a proxy for the lift data directly provided by the mouse as described above. In yet another technique, if data from the mouse representing a shape of movement of the mouse for a short duration prior to mouse lift is within a threshold amount as compared to known mouse movement data representing the shape of movement of the mouse prior to an actual mouse lift, this also could be interpreted as a mouse lift. Here, the known mouse movement data representing the shape of movement of the mouse could be derived from a general population of users or it could be derived from a specific user of the mouse.

Once lifts are identified, either directly from the mouse itself or derived from other data as disclosed above, a pattern of lifts and relative motion of the mouse can be compared to known types of human motion. This pattern of lifts can be relative to linear motion of the mouse (sometimes known as controller display gain) or the pattern of lifts could be relative to a rotation of a view in, for example, a first-person shooter game. Here, the view is as if a camera is rotating within a field of view where this motion can be described in degrees of in-game rotation per, e.g., millimeter of physical mouse motion. If the motion (either linear or rotational) doesn't appear human-like (e.g., if the mouse appears to move 20 yards without any lifts, this would not be human-like), then it is likely that a cheating tool is being employed. This linear motion and rotational motion can be considered as positional information.

Alternative approaches of detecting employment of cheating tools controlling mouse movements rather than humans include detecting when time between mouse lifts is much longer or shorter than in-game motion would suggest. Or, if the motion of the mouse detected after a lift is not primarily in the same direction of the motion of the mouse before the lift, this also could indicate employment of cheating tools controlling mouse movements rather than a human.

While mouse lift detection is described above specifically for a mouse device, this lift detection could be employed on any type of input device where lift may occur, e.g., a trackpad (either stand-alone or incorporated into a game controller). For these types of input devices, detection of cheating tools that control the input device movement could use the same techniques as those described above with respect to a mouse input device.

Thus, lift data can be actual data obtained directly from an input device such as, e.g., a mouse. But also, the lift data can be derived from other data such as, e.g., a determination of periods of no motion of the mouse (either before or after periods of a determined fast motion of the mouse or just on a standalone basis). In both cases, the lift data, actual or derived, indicating a pattern of lifts when interpreted relative to motion of the mouse can be compared to known types of lift patterns of the mouse when interpreted relative to motion of the mouse caused by human control of the mouse to indicate whether a cheating tool is being employed to control movement of the mouse rather than actual human control of movement of the mouse. If the comparison of the lift data relative to mouse motion to known types of human motion (either linear motion or rotational motion) does not appear human-like, then the disclosed cheat detection strategy can report the non-human-like motion to a different part of the cheat detection system which implements a strategy to handle likely cheaters.

The disclosed cheating detection strategy recognizes that the lift data from the mouse device can be used to detect mouse movement that is not consistent with human behavior. By collecting and comparing actual or derived lift data to lift data expected for a specific game, a cheat detection system receiving the lift data could recognize when lifts are not consistent with human behavior.

As discussed above, the cheating detection strategy can be used with video games. Cheating can also occur in other interactive applications, or programs, besides video games, wherein the lift data from the mouse device can be used to detect mouse movement that is not consistent with human behavior. Examples of such interactive programs include computer aided drafting (CAD) programs, authoring tools, animation programs, digital audio programs (e.g., Garage Band), electronic document signing tools, and imaging software (e.g., x-rays, CT scans). Video games will be used herein as examples, but one skilled in the art will understand that the cheating detection strategy disclosed herein is also applicable to other interactive programs.

Referring to the drawings, specifically FIG. 1, a block diagram of an embodiment of a cheat detection system 100 is shown. Cheat detection system 100 includes cheat detection logic 130 and cheat handling logic 150. Cheat detection system 100 detects the possible presence of a cheating tool, the cheating tool generating data representing movement of a mouse input to gaming software running on a gaming system. Cheat detection system 100 detects the presence of the cheating tool by comparing data input to the gaming software representing movement of the mouse to data representing movement of the mouse which could be performed by a human. As disclosed herein, the data representing movement of the mouse input to the gaming software can include lift data 110. Lift data 110 can be generated by one or more of the techniques disclosed herein. Movement of the mouse that could be performed by a human includes known types of human motion 120 as disclosed herein. If movement of the mouse represented by the data input to the gaming software as generated, e.g., by lift data 110, is significantly greater than movement of a mouse that could be performed by a human as generated, e.g., by the known types of human motion 120, then the disclosed cheat detection logic 130 would identify the lift data as lift data that is not human-like 140 to cheat handling logic 150. Cheat handling logic 150 would then generate a cheating tool alert 160 to the gaming software, developer, or an overall malicious detection system indicating that a cheating tool might be present.

The malicious detection system can be located on a server that receives other cheating alerts from other cheat detection systems, including other types of cheating alerts besides those being based on lift data. Additionally, or alternatively, cheat detection logic 130 could determine a degree of confidence as to how unhuman-like the lift data could be. Here, cheat detection logic 130 could identify the lift data as not human-like lift data 140 if a level of the degree of confidence that the lift data is not human-like is above a threshold. Additionally, or alternatively, cheat handling logic 150 could determine the degree of confidence as to how unhuman-like the lift data could be and cheat handling logic 150 could identify the lift data as not human-like if the level of the degree of confidence that the lift data is not human-like is above a threshold rather than cheat detection logic 130. As disclosed above, one example of determining mouse movement that could be performed by a human is to detect when a mouse is physically lifted from a surface upon which the mouse rests, e.g., the surface of the mouse pad. That is, a pattern of lifts detected relative to linear or rotational motion of the mouse can be used to determine if data representing movement of the mouse input to gaming software on a gaming system is generated by a human moving a mouse.

Figure 2:
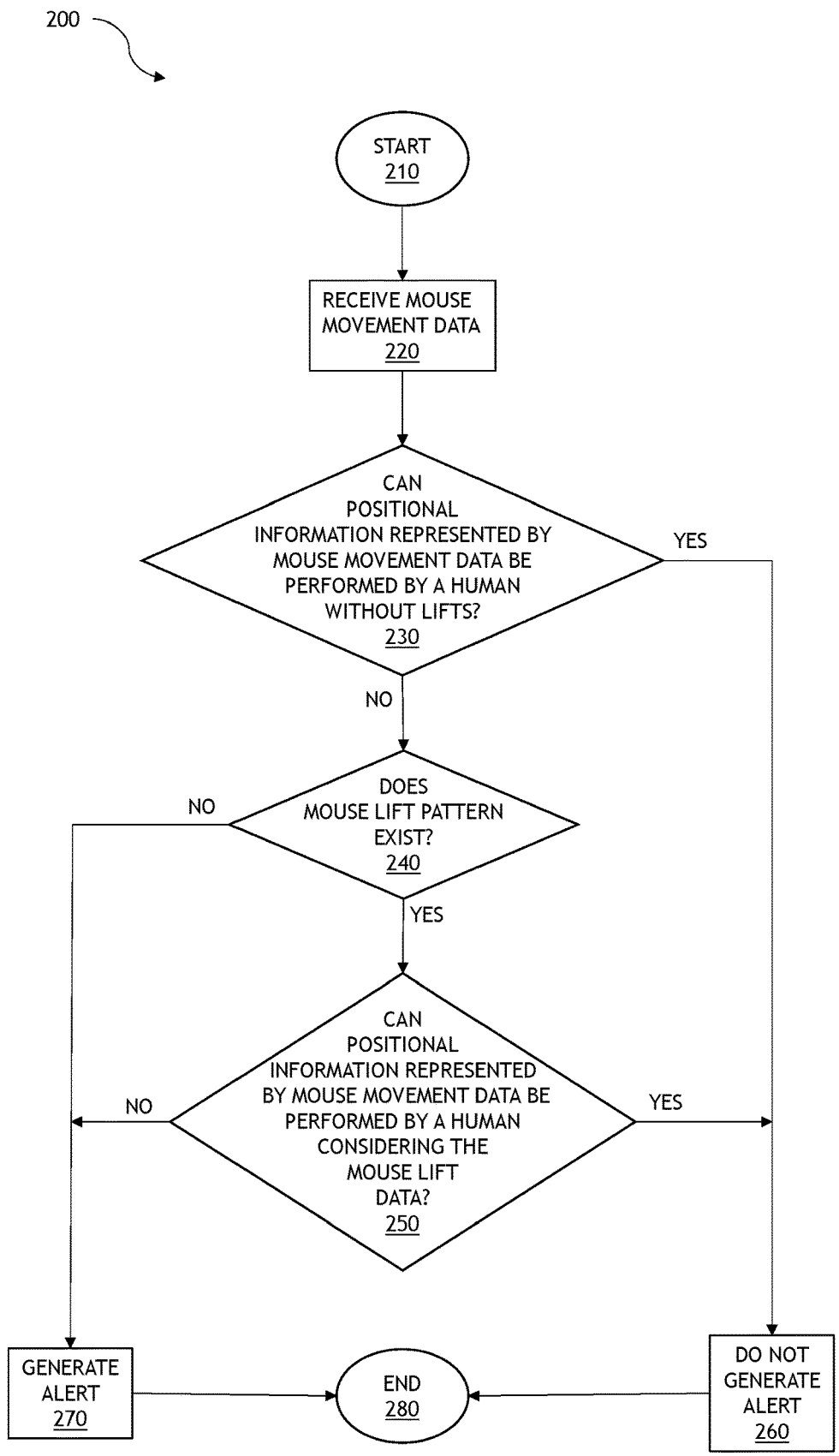
FIG. 2 illustrates a flow diagram of an example method for detecting cheating in video games carried out according to principles of this disclosure.

FIG. 2 illustrates a method 200 of monitoring for cheating in a video game. One or more of the steps of method 200 can be carried out by a series of operating instructions that direct the operation of at least one processor. The series of operating instructions correspond to an algorithm or algorithms that detect possible cheating by determining when mouse movement data violates natural human movement of a mouse. The series of operating instructions could be embodied on a non-transitory computer readable medium as a computer program generating instructions to direct the operations of the at least one processor, such as a processor of a gaming system. The method starts in step 210.

Mouse movement data is received at step 220. At step 230, it is determined whether positional information, e.g., a linear/rotational motion represented by the mouse movement data as disclosed above, can be performed by a human. If it is determined that the positional information represented by the received mouse movement data received at step 220 can be performed by a human at step 230, the method moves to step 260 where no alert is generated. If, however, it is determined that the positional information represented by the received mouse movement data received at step 220 cannot be performed by a human at step 230, the method moves to step 240.

At step 240, it is determined if a mouse lift pattern exists. If it is determined that a mouse lift pattern does not exist at step 240, the method moves to step 270 where an alert is generated. If, however, it is determined that a mouse lift pattern exists at step 240, the method moves to step 250. At step 250, it is determined whether the positional information, e.g., linear/rotational motion represented by the mouse movement data can be performed by a human considering the mouse lift pattern. If it is determined that the positional information represented by the mouse movement data can be performed by a human considering the mouse lift pattern at step 250, the method moves to step 260 where, as noted above, no alert is generated. If, however, it is determined that the positional information represented by the mouse movement data cannot be performed by a human considering the mouse lift pattern at step 250, the method moves to step 270 where, as noted above, an alert is generated. The method ends at step 280 after the alert has either not been generated at step 260 or has been generated at step 270.

Figure 3:
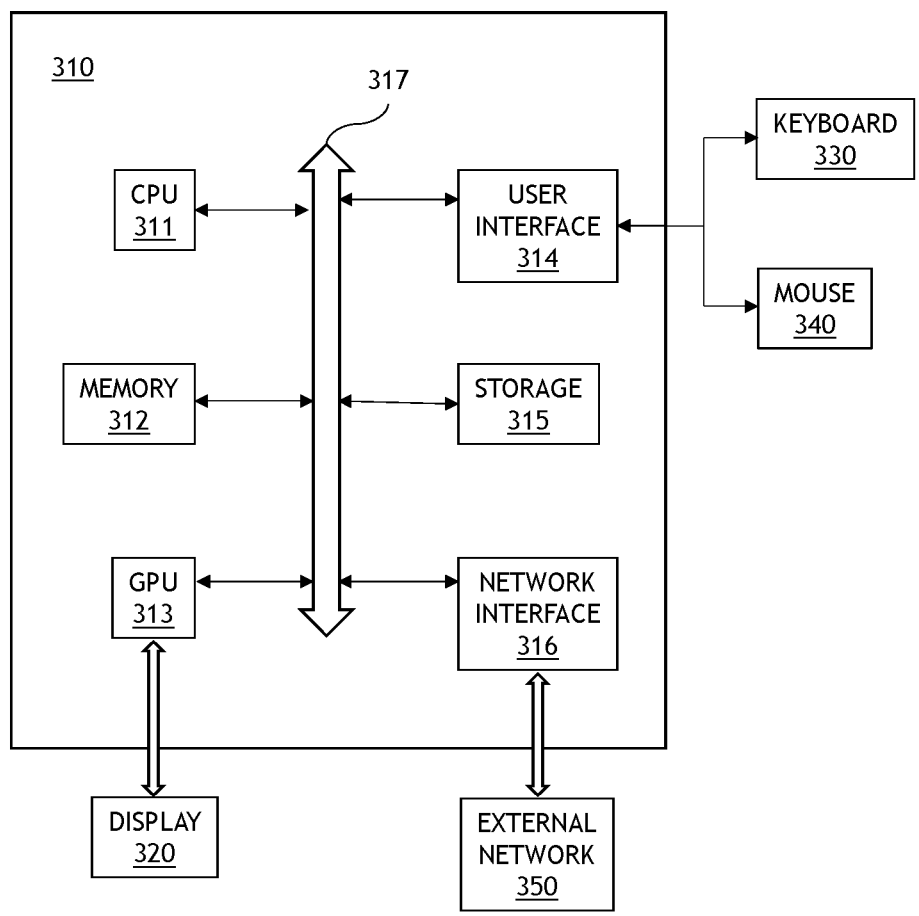
FIG. 3 is a block diagram of an example of a gaming system in which at least a portion of the systems, methods, or computer program products disclosed herein can be implemented.

FIG. 3 illustrates a block diagram of an example of a gaming system 300 in which at least a portion of the cheating detection system disclosed herein can be implemented. Gaming system 300 includes gaming computer 310, display 320, keyboard 330, mouse 340, and connection to an external network 350. Gaming computer 310 can include at least one central processing unit (CPU) 311, memory 312, at least one graphics processing unit (GPU) 313, a user interface 314, storage 315, a network interface 316, and a communications bus 317. While FIG. 3 depicts display 320 connected directly to GPU 313, display 320 could be connected to gaming computer 310 in other conventional manners. For example, display 320 could be another device connected to the user interface 314. Display 320 could be a monitor that is connected to gaming computer 310, wherein the mouse 340 is connected directly to the display 320 and input from the mouse are provided to the gaming computer 310 via the display 320. Logic or algorithms for detecting cheating as disclosed herein could be located on the monitor, on the gaming computer 310, or distributed across both. The algorithms can be represented by a series of operating instructions, referred to as mouse lift cheat detect instructions, stored on memory 312 that direct operation of one or more processors, e.g., CPU 311 and GPU 313.

Gaming computer 310 could be a gaming console, a standalone personal computer (PC), or other like hardware device. Mouse lift cheat detect instructions stored in memory 312 (or storage 315) could cause either CPU 311 or GPU 313 to provide mouse lift cheat detection capability as discussed above and depicted in FIGS. 1 and 2. Other instructions stored on memory 312 (or storage 315) can cause CPU 311 and/or GPU 313 to execute gaming software to enable users to play games. Users provide inputs via keyboard 330 and/or mouse 340 that are received by user interface 314 and communicated via communications bus 317 to CPU 311/GPU 313. Other user input devices, e.g., trackpad, game controller, etc. could be used by the user to provide inputs to the gaming computer 310 via user interface 314 for game play as well.

The above-described alert can be generated by the mouse lift cheat detect instructions stored in memory 312 and communicated to another system over external network 350 via network interface 316. As discussed above, mouse lifts may be detected in a number of different ways and used to detect possible cheating. A mouse lift can be detected by a mouse, such as mouse 400 of FIG. 4, and reported for use by the mouse lift detect instructions stored in memory 312.

Figure 4:
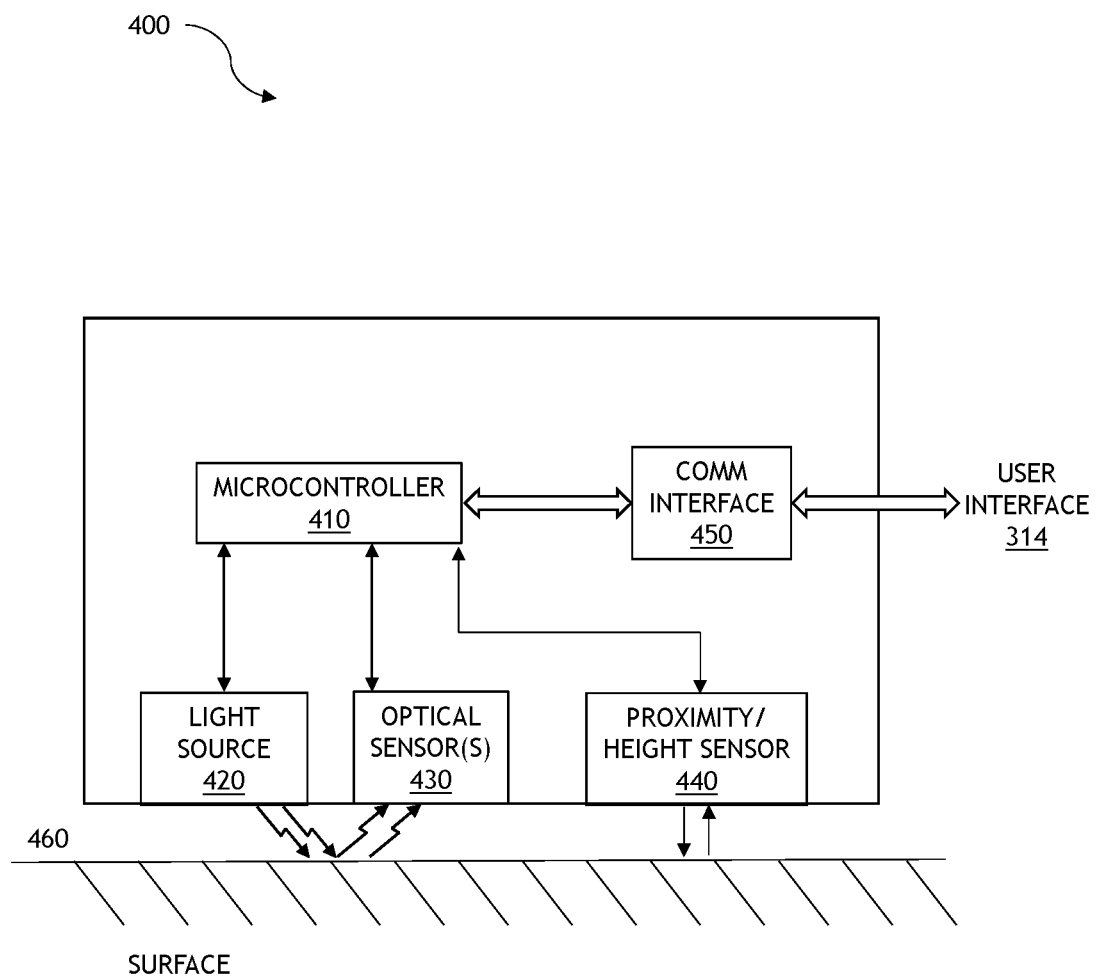
FIG. 4 is a block diagram of a mouse in which at least a portion of the systems, methods, or computer program products disclosed herein can be implemented.

FIG. 4 illustrates an example of a block diagram of mouse 400 used with the principles of this disclosure. Mouse 400 can be similar to mouse 340 described above. Mouse 400 includes microcontroller 410, light source(s) 420, optical sensor(s) 430, and communications interface 450. Mouse 400 can also include a proximity/height sensor 440 as discussed above. An example of one way to detect mouse lifts is to access mouse lift data from mouse 400. As discussed above, mouse lift data can be generated by sensing, with optical sensor(s) 430, if light generated by light source 420 reflected off of a surface 460 upon which mouse 400 rests is in focus. Additionally, or alternatively, mouse lift data can be generated by proximity/height sensor 440 by sensing a proximity or height of proximity/height sensor 440 to surface 460. The mouse lift data can be encapsulated into USB packets by microcontroller 410 and sent by communications interface 450 to user interface 314 of gaming computer 310 of gaming system 300 depicted in FIG. 3. Communications between communications interface 450 of mouse 400 and user interface 314 of gaming computer 310 can be either wired communications or wireless communications using any communication standard, e.g., USB, Bluetooth, etc.

If this mouse lift data is not available from mouse 400, mouse lift detection can be determined from proximity/height information of mouse 400 as discussed above. If either the mouse lift data or proximity/height information from mouse 400 is not available, mouse lift detection can be determined from periods of no motion either before or after periods of fast motion of mouse 400 as discussed above. Alternative options for detecting mouse lift can be by detecting when time between mouse lifts is much higher or lower than in-game motion would suggest or detecting if the motion of the mouse detected after a lift is not primarily in the same direction of pre-lift mouse motion.

A non-transitory computer-readable medium can store a computer program product which causes at least one processor, e.g., CPU 311 and/or GPU 313 of FIG. 3, to implement the method described above and depicted in FIG. 2. The non-transitory computer-readable medium could be any type of non-transitory computer-readable medium, e.g., a solid-state memory, a fixed optical disk, etc. Instructions of this computer program product are similar to the mouse lift cheat detection instructions described above.

Portions of disclosed embodiments may relate to computer storage products with a non-transitory computer-readable medium that have program code thereon for performing various computer-implemented operations that embody at least a part of an apparatus or device to carry out the steps of a method set forth herein. Non-transitory used herein refers to all computer-readable media except for those with transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured or configured to means, for example, designed, constructed, or programmed, with the necessary logic and/or features for performing a task or tasks.

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) disclosed herein, e.g., each device may include similar components, features, and/or functionality of the computing device(s) disclosed herein.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

A network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) described herein with respect to FIG. 3. In addition to previous examples not as a limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Various aspects of the disclosure can be claimed including the systems and methods. Each of the example independent claims provided below may have one or more of the elements of the dependent claims presented below in combination.

Those skilled in the art to which this application relates will appreciate that other and further additions, deletions, substitutions and modifications may be made to the described embodiments.

The invention claimed is:

1. A mouse lift cheat detection method for use with a gaming system, comprising:
   receiving, by the gaming system, mouse movement data from a mouse device;
   determining if a distance represented by the mouse movement data can be performed by a human;
   determining, when the distance represented by the mouse movement data cannot be performed by a human, if a mouse lift pattern exists;
   determining, when the mouse lift pattern exists, if the distance represented by the mouse movement data can be performed by a human considering the mouse lift pattern;
   generating an alert, by the gaming system, when the distance represented by the mouse movement data cannot be performed by a human considering the mouse lift pattern;
   generating the alert, by the gaming system, when the distance represented by the mouse movement data cannot be performed by a human and the mouse lift pattern does not exist; and
   refraining from generating the alert, by the gaming system, when the distance represented by the mouse movement data can be performed by a human or when the distance represented by the mouse movement data can be performed considering the mouse lift pattern; and
   changing gameplay based on the alert wherein the distance represented by the mouse movement data that cannot be performed by a human is not accepted by the gaming system.

2. The mouse lift cheat detection method as recited in claim 1, wherein a rotation represented by the mouse movement data is used in place of the distance represented by the mouse movement data.

3. The mouse lift cheat detection method as recited in claim 1, wherein the mouse lift pattern is determined by mouse lift data generated by the mouse.

4. The mouse lift cheat detection method as recited in claim 3, wherein the mouse lift data is based on reflected light detected by optical sensor(s) on the mouse.

5. The mouse lift cheat detection method as recited in claim 4, wherein the reflected light is light reflected off of a surface the mouse rests on, the light generated by a light source in the mouse.

6. The mouse lift cheat detection method as recited in claim 3, wherein the mouse lift data is based on a height of the mouse over a surface, the height generated by the mouse.

7. The mouse lift cheat detection method as recited in claim 6, wherein the mouse lift data is based on a proximity/height sensor of the mouse.

8. The mouse lift cheat detection method as recited in claim 1, wherein the mouse lift data is based on periods of no motion either before or after periods of fast motion by the mouse.

9. The mouse lift cheat detection method as recited in claim 1, wherein the mouse lift data is based on detecting when time between mouse lifts is much higher or lower than in-game motion would suggest.

10. The mouse lift cheat detection method as recited in claim 1, wherein the mouse lift data is based on motion of the mouse detected after a lift that is not primarily in the same direction of the mouse motion pre-lift.

11. The mouse lift cheat detection method as recited in claim 1, wherein the alert is generated when the mouse lift data suggests lifts are not consistent with human behavior.

12. The mouse lift cheat detection method as recited in claim 11, wherein lifts not consistent with human behavior are based on movement beyond a distance the mouse could be moved without lifting the mouse by a human.

13. The mouse lift cheat detection method as recited in claim 11, wherein lifts not consistent with human behavior are based on movement beyond a distance the mouse could be rotated without lifting the mouse by a human.

14. A gaming system, comprising:
a memory including operating instructions; and
one or more processors that perform operations according to the operating instructions, wherein the operations at least include:
receiving mouse movement data corresponding to motion of a mouse connected to the gaming system;
determining where the mouse movement data is human-like or not human-like using mouse lift data;
generating an alert signal when determining the mouse movement data is not human-like; and
changing gameplay based on the alert wherein the distance represented by the mouse movement data that cannot be performed by a human is not accepted by the gaming system.

15. The gaming system as recited in claim 14, wherein the mouse lift data is determined by lift data generated by the mouse.

16. The gaming system as recited in claim 15, wherein the mouse lift data is based on reflected light detected by optical sensor(s) on the mouse.

17. The gaming system as recited in claim 16, wherein the reflected light is light reflected off of a surface the mouse rests on, the light generated by a light source in the mouse.

18. The gaming system as recited in claim 15, wherein the mouse lift data is based on a height of the mouse over a surface, the height generated by the mouse.

19. The gaming system as recited in claim 18, wherein the mouse lift data is based on a proximity/height sensor of the mouse.

20. The gaming system as recited in claim 14, wherein the mouse lift data is based on periods of no motion either before or after periods of fast motion by the mouse.

21. The gaming system as recited in claim 14, wherein the mouse lift data is based on detecting when time between mouse lifts is much higher or lower than in-game motion would suggest.

22. The gaming system as recited in claim 14, wherein the mouse lift data is based on motion of the mouse detected after a lift that is not primarily in the same direction of the mouse motion pre-lift.

23. The gaming system as recited in claim 14, wherein the alert is generated when the mouse lift data suggests lifts are not consistent with human behavior.

24. The gaming system as recited in claim 23, wherein lifts not consistent with human behavior are based on movement beyond a distance the mouse could be moved without lifting the mouse by a human.

25. The gaming system as recited in claim 23, wherein lifts not consistent with human behavior are based on movement beyond a distance the mouse could be rotated without lifting the mouse by a human.

26. A computer program product embodied on non-transitory computer-readable medium that include instructions that cause at least one processor to:
receive mouse movement data from a mouse device;
determine if a distance represented by the mouse movement data can be performed by a human;
determine, when the distance represented by the mouse movement data cannot be performed by a human, if a mouse lift pattern exists;
determine, when the mouse lift pattern exists, if the distance represented by the mouse movement data can be performed by a human considering the mouse lift pattern;
generate an alert when the distance represented by the mouse movement data cannot be performed by a human considering the mouse lift pattern;
generate the alert when the distance represented by the mouse movement data cannot be performed by a human and the mouse lift pattern does not exist; and
refrain from generating the alert when the distance represented by the mouse movement data can be performed by a human or when the distance represented by the mouse movement data can be performed considering the mouse lift pattern; and
changing gameplay based on the alert wherein the distance represented by the mouse movement data that cannot be performed by a human is not accepted by the at least one processor.

27. The computer program product as recited in claim 26, wherein a rotation represented by the mouse movement data is used in place of the distance represented by the mouse movement data.

28. The computer program product as recited in claim 26, wherein the mouse lift pattern is determined by mouse lift data generated by the mouse.

29. The computer program product as recited in claim 26, wherein the alert is generated when the mouse lift data suggests lifts are not consistent with human behavior.

* * * * *